(No Model.)
W. J. COUGHLIN.
BLOTTER HOLDER.
No. 267,676. Patented Nov. 21, 1882.
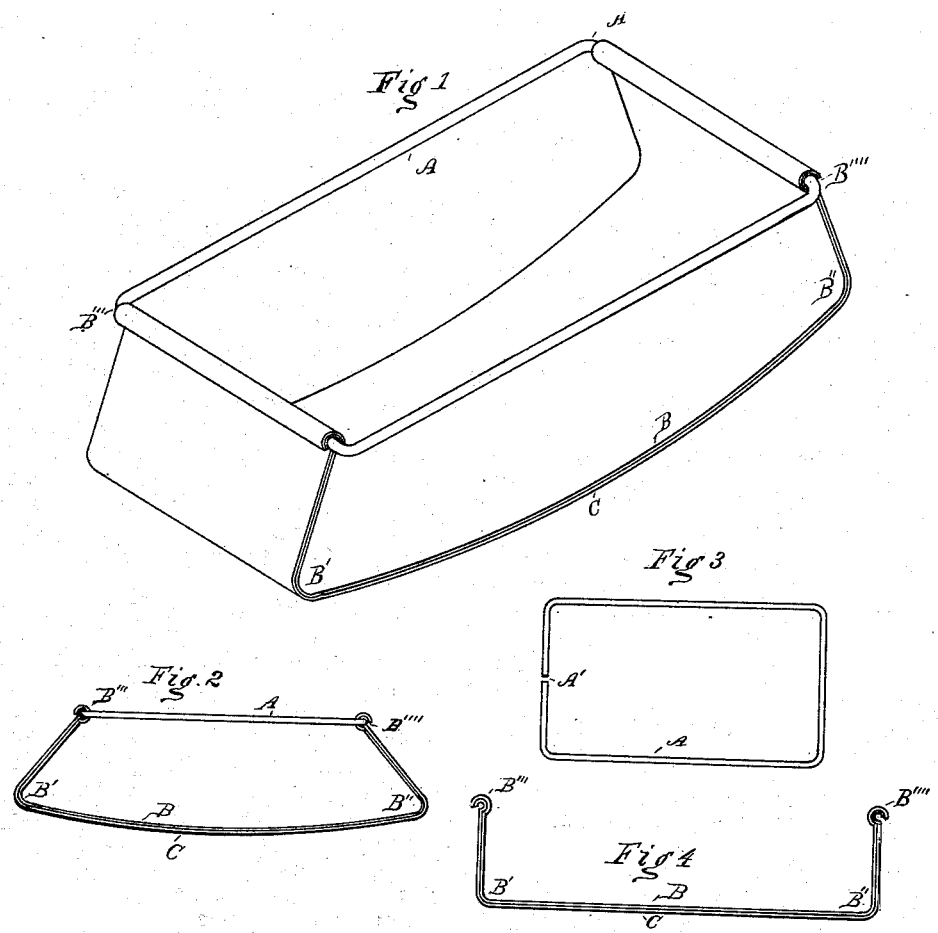
Witnesses
Kirkley Hyde.
Irving S. Porter.
Inventor
William J. Coughlin,
By Albert M. Moore,
His Attorney.

UNITED STATES PATENT OFFICE.

WILLIAM J. COUGHLIN, OF LOWELL, MASSACHUSETTS.

BLOTTER-HOLDER.

SPECIFICATION forming part of Letters Patent No. 267,676, dated November 21, 1882.

Application filed February 27, 1882. (No model.)

*To all whom it may concern:*

Be it known that I, WILLIAM J. COUGHLIN, of Lowell, in the county of Middlesex and Commonwealth of Massachusetts, have invented a certain new and useful Improvement in Blotter-Holders, of which the following is a specification.

My invention relates to an elastic sheet of metal or other suitable material, permanently bent upward near its ends and having its end edges bent into hooks, and to a handle made of wire bent into quadrangular form and shorter than the distance between said hooks and adapted to enter said hooks, and, by drawing said hooks toward each other, to curve the bottom of said plate and to hold a blotting-paper between said handle and said hooks.

In the accompanying drawings, Figure 1 is an oblique view of my blotter-holder with a blotter attached. Fig. 2 is a side elevation of the same. Fig. 3 is a plan of the handle detached. Fig. 4 is a side elevation of the sheet and a blotter without the handle.

B is a sheet of metal, having some degree of elasticity and permanently bent upward at $B'$ $B''$, near its ends, at about right angles. The end edges of the sheet B are bent over in either direction to form hooks $B'''$ $B''''$, suitable to receive two opposite sides of the handle A. The handle A is preferably constructed of round wire bent into quadrangular shape, as in Fig. 3, and having its ends joined or not, as may be desired. If the ends of the wire are not joined, the break $A'$ should be near the middle of one of the sides which enter the hooks $B'''$ $B''''$. The sides of the handle A which enter the hooks are just long enough to take in the end edges of the sheet B, and the other sides of said handle are a little shorter than the horizontal bottom part of the sheet B. The handle is applied to the sheet B by crowding the hooks $B'''$ $B''''$ toward each other and putting the short sides of said handle over the ends of said sheet and into said hooks, and then allowing said hooks to spring away from each other. The handle may be removed by bending the hooks toward each other. If a sheet, C, of blotting-paper of the same size as the sheet B is smoothly laid on the under and outer surface of said sheet B and into the hooks and the handle is then applied to the hooks, as above described, said paper will be pinched between said hooks and handle and held in place, as shown in Figs. 1 and 2. To remove the paper after it becomes useless it is only necessary to remove the handle, as above described. The handle A, being shorter than the bottom of the sheet B, causes the bottom of said sheet to take the curved shape shown in Figs. 1 and 2. The permanent bends at $B'$ $B''$ allow the nearly-vertical parts of the sheet B to swing on the handle A when the blotter is pressed down on a flat surface, so that the bottom of said sheet B will touch a much larger surface than if the ends of said bottom were held at a fixed distance from each other. The handle A, being of round wire, does not cut the hands, and obviates the necessity for a knob, such as is commonly used to grasp similar blotters by, and, being just wide enough to take in the sheet B and the sheet of blotting-paper, prevents the blotting-paper from moving sidewise on the sheet $B''$. The sheet B may be made of rubber, celluloid, or other suitable elastic material.

I claim as my invention—

1. The combination of the elastic sheet B, permanently bent upward near its ends, at $B'$, $B''$, at about right angles, and provided with hooks $B'''$ $B''''$, and a handle, A, adapted to enter said hooks and to be held in position by the elasticity of said plate, as and for the purpose specified.

2. A blotter-holder consisting of an elastic sheet, B, permanently bent upward near its ends, at $B'$ $B''$, and provided with hooks $B'''$ $B''''$ at its end edges, in combination with a handle, A, formed of wire bent into a quadrangular form, as described, for the purpose specified.

WM. J. COUGHLIN.

Witnesses:
ALBERT M. MOORE,
SIMEON G. LYFORD.